Sept. 1, 1959　　　　S. D. VIGREN ET AL　　　　2,902,563
POLARIZED ELECTROMAGNETIC CONTROL DEVICES
Filed Nov. 23, 1954　　　　　　　　　　　　4 Sheets-Sheet 1

INVENTORS
STEN DANIEL VIGREN
PER HARRY ELIAS CLAESSON
ROLF ALBIN ZANDER

ATTORNEYS

United States Patent Office 2,902,563
Patented Sept. 1, 1959

2,902,563

POLARIZED ELECTROMAGNETIC CONTROL DEVICES

Sten Daniel Vigren, Stockholm, Per Harry Elias Claesson, Danderyd, and Rolf Albin Zander, Stockholm, Sweden Application November 23, 1954, Serial No. 470,752

17 Claims. (Cl. 200—93)

This invention relates to polarized electromagnetic control devices, such as polarized relays and polarized bells, e.g. provided with a so-called balanced armature, of the type having substantially different paths for the permanent flux and the control flux except at the pole faces, between which the operation of the armature is effected, where the paths are common. Preferably the invention has regard to such a control device in which the permanent flux is generated by only one permanent magnet.

Control devices of this general type are previously known, but ordinarily they are imperfect as the permanent field is too weak depending on imperfections of the suspension arrangement for the armature. The suspension arrangement is in known devices not so constructed that the armature maintains its predetermined position and its stability under the influence of a strong permanent magnetic field. This will cause the contact pressure or corresponding operation pressure to be low and irregular, and it is not possible to make such known devices satisfactorily sensitive and safe in operation.

Other known polarized control devices have a sufficiently strong permanent field, but it has then been necessary to use two permanent magnets which have been made equally strong through special adjustment and magnetizing procedures. The use of two permanent magnets has also caused the constructions to be comparably complicated.

These abovementioned drawbacks are eliminated through the present invention which is mainly characterized by the fact, that the armature is swingably mounted adjacent to at least one return member for the permanent flux of magnetically conducting material, for instance weak iron, which return member is magnetically coupled to one pole of the permanent magnet, the other pole of the permanent magnet being magnetically coupled to the pole pieces attracting the armature and forming part of the magnetic circuit of the control flux.

In the case of the armature having the shape of a two-armed lever, one end of which is disposed between the pole pieces of the magnetic circuit for the control flux and the other end of which is provided with contacts or some other operation member, the armature is suitably made with reduced cross-sectional area on that side of its turning axis where the lastmentioned end is situated. Preferably the armature then has the same thickness along substantially all its length but is made narrower the abovementioned portion having reduced cross-sectional area. When the armature is balanced an enlarged travel at the end of the armature portion having reduced cross-sectional area will be the result which causes the control device to be highly sensitive.

The invention will be clearly understood in connection with the description of the accompanying drawings in which.

Figure 1:
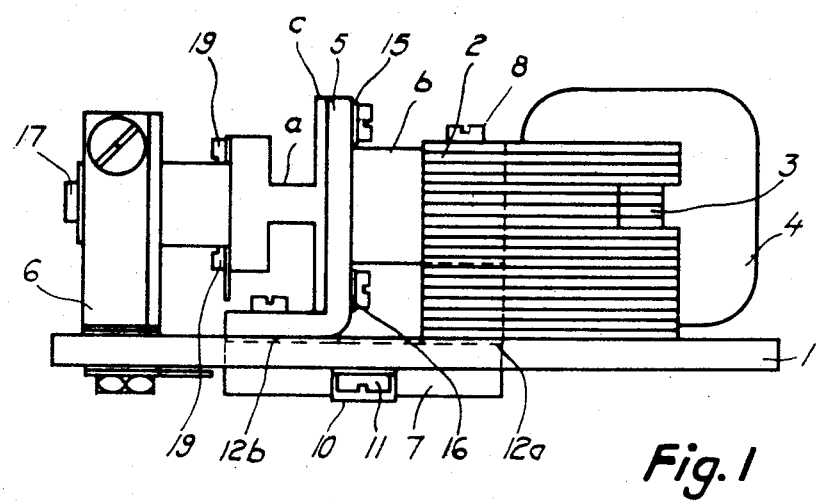
Figs. 1 and 2 show a polarized relay according to the invention in side and plan view respectively.

On a base plate of magnetically non-conducting material the following parts are mounted:

Pole pieces 2, a core 3, a winding 4, a suspension device 5 for supporting an armature 17, contact members 6 and a permanent magnet 7. The pole pieces 2 are attached to the base plate 1 by means of screws 8. The suspension device 5 for supporting the armature is attached to the base plate 1 by means of screws 9. The magnet 7 is attached to the base plate 1 by means of a holding strip 10 and screws 11. In order that the magnet 7 shall not magnetically short-circuit the poles of the pole pieces 2, between which the armature is moving, a distance plate 12a of non-magnetic material is inserted between the magnet and said poles. A corresponding distance member 12b is inserted between the other end of the armature and the suspension device 5, and this may suitably be of ferro-magnetic material.

The suspension device 5 for the armature comprises return members 13 and 14, which, as in the shown embodiment may be interconnected at one or both of their ends so that they rather form one single member. The return members are here formed by a slotted plate having its base portion angle-bent so as to turn one flat side towards the permanent magnet 7, thereby facilitating the passage of the permanent flux. Between these return members and closely to their facing surfaces the armature 17 is disposed so that the permanent flux easily can pass to the armature from both sides along all its width. The armature is pivotally mounted on the return members 13 and 14 by means of two leaf springs 15 and 16 screwed to the armature as well as to the return members. As appears from the figures the springs 15 and 16 are disposed normally to the longitudinal direction of the armature, so that a turning axis of the armature is formed which is fixedly located in a plane, preferably the central plane, between the return members. Hereby it is possible to maintain predetermined minimum air gaps between the armature and the return members. Since the return members have a very small extension in the longitudinal direction of the armature the attraction forces on the armature caused by the permanent flux will not result in appreciable turning movements of the armature, even though, as in the shown embodiment, the armature turning axis is situated adjacent to one side of the return members.

Furthermore, the small dimensions of the return members in the longitudinal direction render it possible to make the air gaps between them and the armature very small without preventing the armature from moving freely about its turning axis to the required degree.

The armature 17 is provided with contacts 18 of a type known per se, which are screwed to the armature by means of screws 19. Also the counter-contact members 6 are of a type known per se.

Thanks to the return members 13 and 14 a very strong magnetic flux can be transferred to the armature. Hereby it is rendered possible to effect so high a contact pressure as to make the forward portion a of the armature materially longer than the rear portion b, preferably two or three times longer, without hazarding the required contact pressure. The portion a of the armature is preferably made with substantially less cross-sectional area than the portion b, so that the armature will be substantially balanced about its turning axis towards external acceleration and retardation forces. In order to obtain great surfaces for the passage of the flux between the armature and the return members the armature is provided with an expanded portion c opposite to the return members, which portion has a small extension in the longitudinal direction of the armature and thus does not appreciably increase the moment of inertia of the armature. Suitably the armature is made in one single piece with even thickness, the portions a, b and c being shaped by a cutting operation.

In spite of a very small angular movement of the armature sufficient contact spaces at the contacts may be obtained thanks to the great ratio between the lever arms of the armature. Due to the small armature movement the air spaces between the armature and the pole faces on the pole pieces 2 can be very small, so that the sensitivity of the relay will be high.

Figure 2:
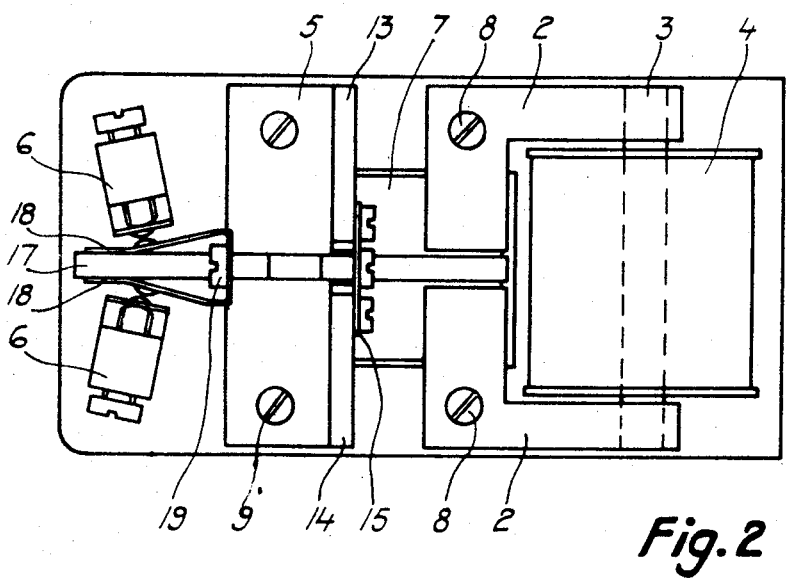
Figure 3:
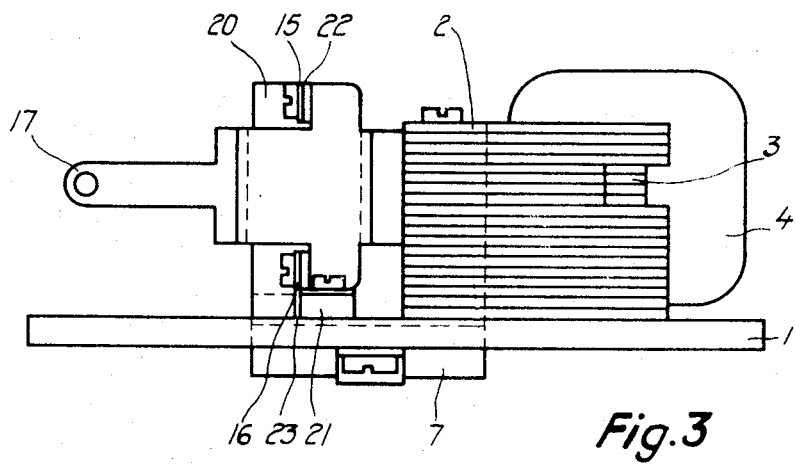
Figs. 3 and 4 show a modified device according to the invention in side and plan view respectively.
Figure 4:
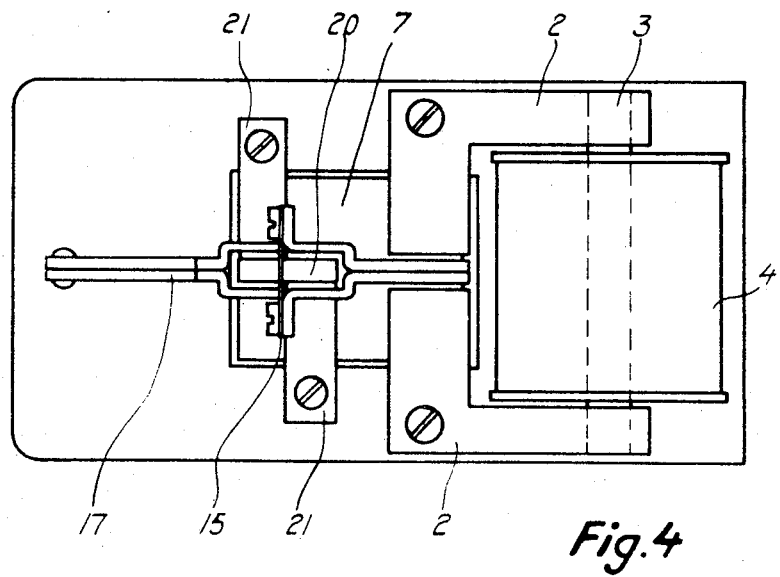

In the polarized relay shown in Figs. 3 and 4 the armature is supported by one single return member 20 provided with angle-bent lugs 21 screwed to the base plate 1. The armature 17 is at least adjacent to the return member 20 formed by two parts surrounding the return member, so that the permanent flux readily can pass between the armature and the return member. The latter is provided with slots 2 2and 23 for receiving leaf-springs 15 and 16 each attached to the armature by means of two screws. The other parts shown in the figures have the same designations and functions as in Figs. 1 and 2, and reference is therefore made to these figures. Due to the fact that springs 15 and 16 are disposed substantially at the centre portion of return member 20 in the longitudinal direction of the armature the effect of the attracting forces caused by the flux passage between the armature and the return member will be substantially neutralized.

Figure 5:
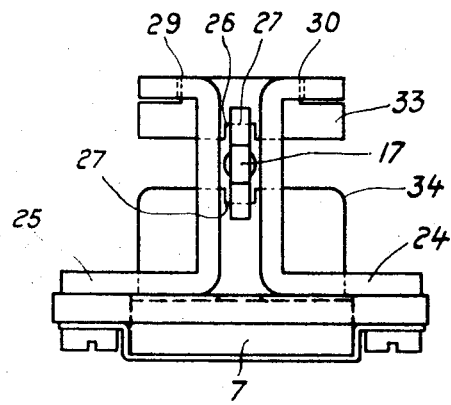
Figs. 5 and 6 show a further modification in end and plan view respectively.
Figure 6:
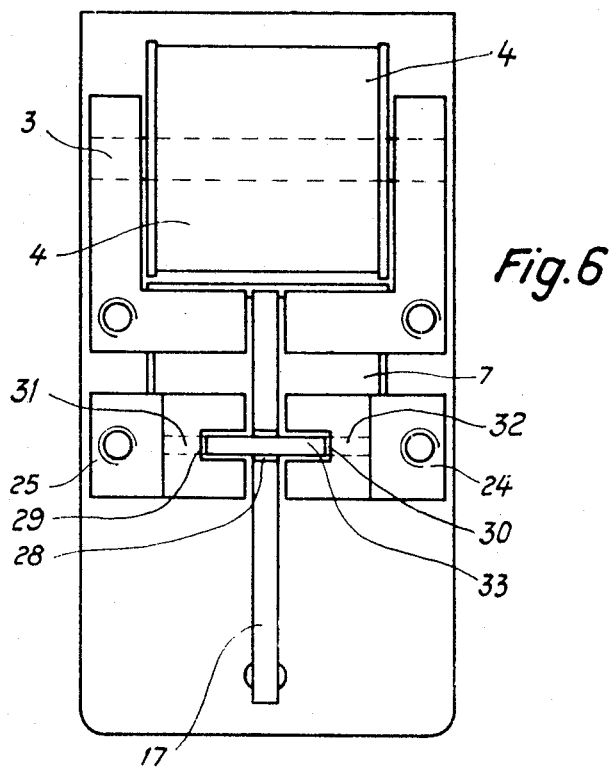

In the embodiment according to Figs. 5 and 6 there are two return members 24 and 25 of magnetically conducting material which are screwed to the bottom plate 1 and turn their bottom horizontal flat sides towards one pole of the permanent magnet 7. Vertical flat sides on the return members 24 and 25 are turned against the flat sides of the armature 17 disposed between them, so that large passage areas for the permanent flux are achieved. The armature is swingably supported and kept in position by plates 33 and 34. The plate 33 is received by and kept in position in slots 29 and 30 in the outwardly bent upper ends of the return members. The plate 34 is received by and kept in position in the base portions of the return members 31 and 32. The plates 33 and 34 are provided with central recesses 27 engaging recesses in the armature, one of which that is designated 28 is visible in Fig. 6. The lateral surfaces of the recesses 27 thus determine the position of the armature in the side direction so that air spaces between the armature and return members are maintained, while the recesses 28 determine the position of the armature in its longitudinal direction and prevent it from turning in the vertical plane. In other words, the recesses 27 and 28 form a mounting device for the armature providing a vertical turning axis substantially coinciding with the central vertical plane of the armature and the central plane of the plates 33 and 34 substantially normal thereto. In the shown embodiment these plates are disposed at the central portion of the return members as seen in the longitudinal direction of the armature so that substantially equal passage areas for the permanent flux are provided on each return member on either side of the turning axis and at substantially the same distance from it, whereby the effect of the attracting forces acting between the armature and the return members are neutralized as much as possible.

The armature turning axis may instead or in combination with the recesses 27 and 28 be established by means of vertical pins in the armature which pass into holes in the surfaces situated adjacent to the armature on the plates 33 and 34 or vice versa.

It is also possible to substitute pellets for the abovementioned pins which then are held in position through the pressure from the armature on one side and the plates 33 and 34 respectively on the other side, for instance in semispherical or cylindrical cavities in the armature and plates respectively.

The plates 33 and 34 may consist of magnetically conducting material when it is important that the passage of the magnet flux should be facilitated as much as possible. When it is desired that attraction forces should not exist closely to the turning axis of the armature the said plates may instead be made of magnetically nonconducting material.

Figure 7:
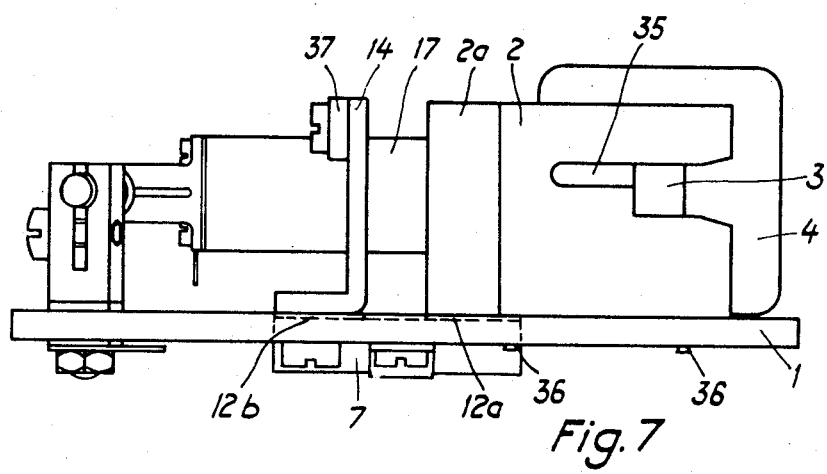
Figs. 7 and 8 show still another modification in side and plan view respectively.
Figure 8:
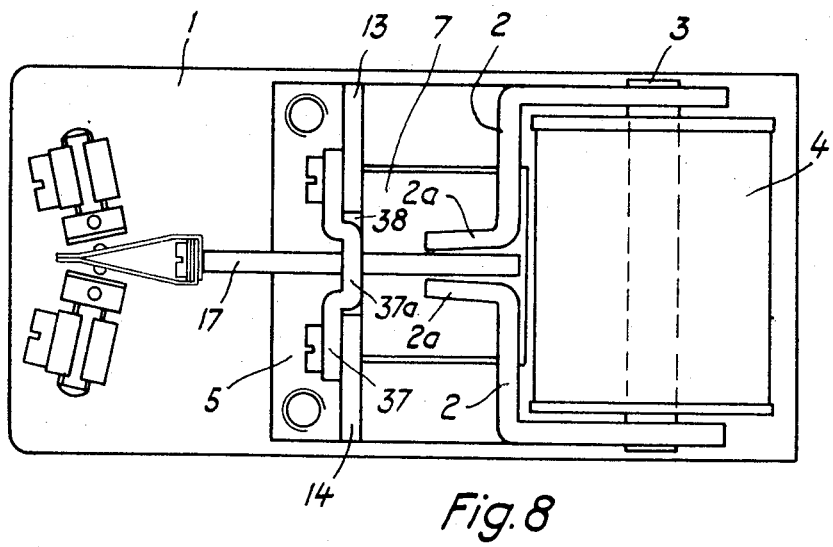

In the polarized relay shown in Figs. 7 and 8 the pole pieces 2 are not laminated but consist of bent pieces of sheet metal standing on edge. The pole faces are situated on forwardly bent projecting portions 2a, and the core 3 is fixed in the pole pieces in slots 35 which through the shown shape impart to the upper portions of the pole pieces a slight resiliency, so that the core easily can be inserted in the slots and kept in position by spring pressure. The pole pieces 2 are on their underside provided with projections 36 passing through holes in the base plate 1 and on its underside clinched or expanded so as to form rivets for the attachment of the magnetic circuit of the control flux.

The armature 17 is swingably supported by a return member 13, 14 comprising an angle bent base portion 5 turned against the permanent magnet 7. These parts are substantially similar to those having the same designations in Figs. 1 and 2. In this embodiment, however, leafsprings are not used for the fixation of the armature. Instead the armature rests on the bottom surface of a central slot between portions 13 and 14, which slot at the bottom is slightly wider than the armature is thick. At the top this slot is widened to a recess, visible at 38 in Fig. 8, and a crosspiece 37, preferably but not necessarily of magnetically conducting material, is screwed to the portions 13 and 14 and has a central bent portion 37a extending substantially in the same plane as the portions 13 and 14. The armature 17 and the cross piece 37 are provided with slots or recesses, so that the armature is swingably supported and kept in position substantially in the same way as has been described in connection with Figs. 5 and 6. It is obvious that also in this case pins or pellets can be used for pivoting the armature in the same manner as in the described modification of the embodiment shown in Figs. 5 and 6.

The simple construction shown in Figs. 7 and 8 is particularly suitable for use in polarized bells, although of course also the other described constructions can be used for this purpose.

The contacts on the armature are then simple to be replaced by a tongue or clapper and the counter-contact members (or one of them) are replaced by bell bodies mounted on the base plate. For such a purpose, however, a relatively long travel and consequently a long lever arm for the clapper is required, and it may then be advantageous with regard to the space to make the armature one-armed and provide the clapper with a lever extending rearwardly above or underneath the winding 4, preferably in a space between the winding and the base plate, the bell bodies being accordingly mounted on the base plate opposite to the winding 4 in relation to the armature turning axis.

We claim:

1. In a polarized electromagnetic control device containing an electromagnet containing spaced poles, an armature mounted for pivotal movement about a turning axis with one end movable between said poles, a permanent magnet for producing a permanent magnetic flux in the armature, means mounting the permanent magnet with one pole remote from and the other pole substantially symmetrically positioned with respect to the electromagnet poles so that the flux produced by the permanent magnet passes through the poles of the electromagnet but in a spaced relation with the movable end of said armature so that the permanent magnet flux otherwise flows along a path separate from the path of the flux produced by the electromagnet, said device further having at least one member of soft iron in the magnetic path for the permanent magnet flux, said one member being magnetically coupled to one pole of the permanent magnet and having one end located adjacent the turning axis of the armature and closely spaced to the armature, said one end having a surface facing the armature, the principal dimension of said surface extending in a direction parallel with the turning axis of the armature.

2. A polarized electromagnetic control device comprising an electromagnet having spaced poles, an armature mounted for pivotal movement between said poles and a permanent magnet for producing a permanent magnetic flux in the armature, means mounting the permanent magnet with one pole remote from the other pole adjacent the poles of the electromagnet so that the flux produced by the permanent magnet passes through the poles of the electromagnet but otherwise flows along a path separate from that of the flux produced by the electromagnet, the device further comprising a soft iron member in the magnetic path for the permanent magnet flux, said soft iron member being magnetically coupled to one pole of the permanent magnet and having at least one surface facing the armature at a position adjacent the axis of pivotal movement of the armature, the extension of said surface in a direction parallel to the longitudinal direction of the armature being considerably smaller than its extension in a direction at right angles to the longitudinal direction of the armature, and the air space between the armature and said surface being very small to provide a low reluctance flux path between the armature and said soft iron member.

3. A polarized electromagnetic control device comprising an electromagnet having spaced poles, an armature comprising a two-armed lever mounted for pivotal movement with one of said arms movable from one of said spaced poles to the other and a permanent magnet for producing a permanent magnetic flux in the armature, means supporting the permanent magnet with one pole adjacent said one of said arms and substantially symmetrically with the electromagnet poles so that the flux produced by the permanent magnet passes through the poles of the electromagnet but otherwise flows along a path separate from that of the flux produced by the electromagnet, and the armature having a rectangular cross section at its axis of pivotal movement and being mounted so as to have said axis parallel to the principal dimension of the cross section, the device further comprising a soft iron member in the magnetic circuit for the permanent magnetic flux, said soft iron member being magnetically coupled to one pole of the permanent magnet and having one end provided with at least one surface facing the armature adjacent the pivot axis of the armature, said surface extending in parallel with the pivot axis of the armature along the entire extent of the armature in the direction of the principal dimension to provide a low reluctance flux path between the armature and said one surface of the soft iron member.

4. In a polarized electromagnetic operator including an electromagnet having closely positioned poles, an armature comprising a two-armed lever, one of which is movable between said poles and switch contacts on the other of said lever arms, a permanent magnet for producing a permanent magnetic flux in the armature, means mounting the permanent magnet with one pole only adjacent the electromagnet poles and said one lever arm so that the flux produced by said permanent magnet passes through the poles of the electromagnet but otherwise flows in a path separate from the path of the flux produced by the electromagnet, and a soft iron member magnetically coupled to one pole of the permanent magnet and supporting the armature for pivotal movement about a turning axis, said soft iron member having at least one surface facing the armature at a position closely adjacent the turning axis of the armature, the extension of said one surface in a direction parallel to the longitudinal axis of the armature being considerably smaller than the extent of said one surface in a direction at right angles to the longitudinal axis of the armature to provide a low reluctance path of substantial area between the armature and said one surface.

5. A polarized electromagnetic control device comprising an electromagnet having spaced poles, an armature comprising a two-armed lever mounted for pivotal movement about a turning axis, one arm of said lever being movable between said spaced poles, a permanent magnet for producing a permanent magnetic flux in the armature, means mounting the permanent magnet along but spaced from said armature and having one pole only adjacent the poles of the electromagnet so that the flux produced by the permanent magnet passes through the poles of the electromagnet but otherwise flows along a path separate from that of the flux produced by the electromagnet, and a member of soft iron serving as a return member for the permanent magnet flux, said return member being magnetically coupled to one pole of the permanent magnet remote from said electromagnet poles and having one end bifurcated forming spaced limbs, the limbs of said bifurcated end extending on opposite sides of the armature adjacent to and parallel with the turning axis of the armature to provide a low reluctance flux path between the armature and said return member.

6. A polarized electromagnetic control device as claimed in claim 5, in which the armature is supported by the bifurcated end of the return member.

7. A polarized electromagnetic control device comprising an electromagnet, having closely spaced poles, an armature having only one arm mounted for pivotal movement between said spaced poles, a permanent magnet for producing a permanent magnetic flux in the armature, means supporting the permanent magnet having one pole only adjacent the poles of the electromagnet so that the flux produced by the permanent magnet passes through the poles of the electromagnet but otherwise flows along a path separate from that of the flux produced by the electromagnet, two members of soft iron serving as return members for the permanent magnetic flux, said return members being magnetically coupled to one pole of the permanent magnet and extending on opposite sides of the armature adjacent to and parallel with the turning axis of the armature.

8. A polarized electromagnetic control device as claimed in claim 7, in which the armature is supported by said return members.

9. A polarized electromagnetic control device comprising an electromagnet having spaced poles, an armature having one end mounted for pivotal movement between said poles and a permanent magnet for producing a permanent magnetic flux in the armature, means mounting the permanent magnet with one pole only adjacent said one end of the armature so that the flux produced by the permanent magnet passes through both poles of the electromagnet but otherwise flows along a path separate from that of the flux produced by the electromagnet, the device further comprising at least one member of soft iron serving as a return member for the permanent magnet flux, said return member being magnetically coupled to one pole of the permanent magnet and having one portion located adjacent the turning axis of the armature, said one portion having at least one surface facing the armature whose principal dimension is in a direction parallel with the turning axis of the armature to provide a low reluctance flux path between the armature at the turning axis and said one surface, the armature forming a two-armed lever one arm of which carries contact members and the other arm of which is arranged to be acted upon by the poles of the electromagnet, the first mentioned arm being substantially longer than the last mentioned arm.

10. The polarized electromagnetic control device as claimed in claim 9, wherein the armature is balanced with respect to its turning axis and has substantially the same thickness along its whole length, the width in the direction of the turning axis of the longest arm being less than that of the short arm.

11. The polarized electromagnetic control device as defined in claim 10 wherein the width of the armature at the turning axis is at least as great as the width of the short arm.

12. The polarized electromagnetic control device as claimed in claim 9, wherein the long arm of the armature is between 2 and 3 times longer than the short arm.

13. A polarized electromagnetic operator including an electromagnet having spaced poles, an armature comprising a two-armed lever mounted for pivotal movement about a turning axis with one arm of said lever movable between said poles, a permanent magnet for producing a magnetic flux in the armature, means mounting the permanent magnet with one pole adjacent the spaced poles of the electromagnet that the flux produced by said permanent magnet passes through both poles of the electromagnet but otherwise flows in a path separate from the path of the flux produced by the electromagnet, and a soft iron member magnetically coupled to one pole of the permanent magnet and extending on opposite sides of the armature and in closely spaced relationship therewith to provide a substantially zero net turning force in a plane parallel to the longitudinal axis of the armature through the turning axis of the armature.

14. A polarized electromagnetic operator including an electromagnet having spaced poles, an armature mounted for pivotal movement about a turning axis having one end movable between said poles, a permanent magnet for producing a magnetic flux in the armature, means mounting the permanent magnet with one pole adjacent said one end of the armature and the electromagnet poles so that the flux produced by said permanent magnet passes through the poles of the electromagnet but otherwise flows in a path separate from the path of the flux produced by the electromagnet, and a magnetic return path for the permanent magnet flux including soft iron material magnetically coupled to one pole of the permanent magnet and formed to provide opposing faces on opposite sides of said armature to provide parallel paths between the armature and the opposing faces on said soft iron material having substantially equal reluctances.

15. The polarized electromagnetic operator as defined in claim 14 wherein both of said opposed faces are rectangular and substantially the same size and the turning axis of the armature is perpendicular to the longitudinal axis of the armature.

16. The polarized electromagnetic operator as defined in claim 15 wherein said opposed faces are adjacent said turning axis and the principal dimension of said opposed rectangular faces is parallel with the turning axis.

17. The polarized electromagnetic operator as defined in claim 16 wherein said armature is mounted for pivotal movement on said soft iron material.

References Cited in the file of this patent

UNITED STATES PATENTS

| | | |
|---|---|---|
| 1,191,976 | Kettering | July 25, 1916 |
| 1,743,494 | Snyder | Jan. 14, 1930 |
| 2,526,804 | Carpenter | Oct. 24, 1950 |
| 2,594,088 | Sonnemann et al. | Apr. 22, 1952 |
| 2,609,462 | Joseph | Sept. 2, 1952 |
| 2,652,464 | Vigren et al. | Sept. 15, 1953 |
| 2,698,366 | Howell | Dec. 28, 1954 |
| 2,731,527 | Marsh | Jan. 17, 1956 |
| 2,741,728 | Distin | Apr. 10, 1956 |